J. WASH.
Bee Hiver.

No. 201,964.              Patented April 2, 1878.

WITNESSES:
E. Wolff
J. H. Scarborough

INVENTOR:
J. Wash.
By Munn & Co
ATTORNEYS.

UNITED STATES PATENT OFFICE.

JAMES WASH, OF MOUNT STERLING, ILLINOIS.

IMPROVEMENT IN BEE-HIVERS.

Specification forming part of Letters Patent No. 201,964, dated April 2, 1878; application filed September 22, 1877.

*To all whom it may concern:*

Figure 1:
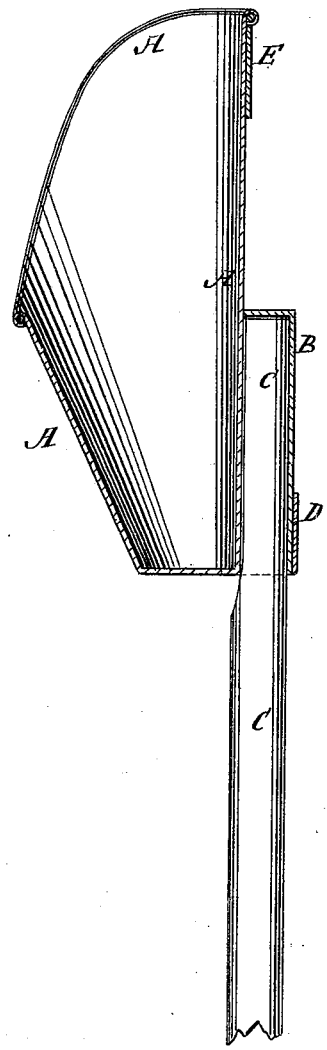
Figure 2:
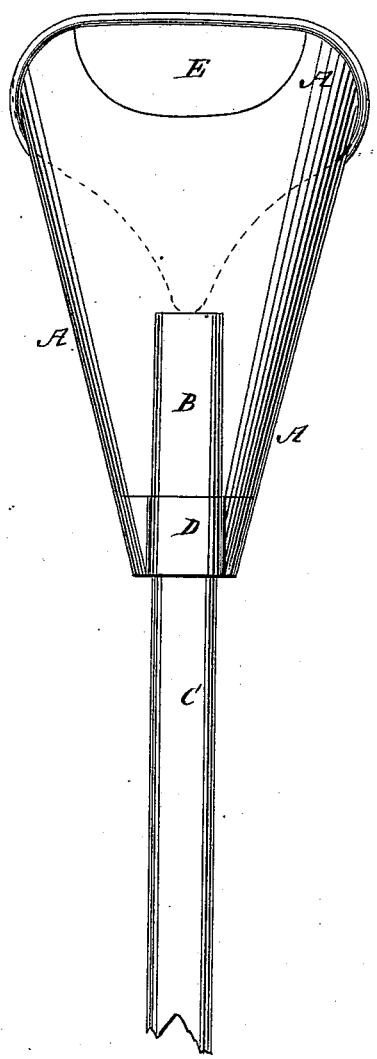

Be it known that I, JAMES WASH, of Mount Sterling, in the county of Brown and State of Illinois, have invented a new and Improved Device for Hiving Swarms of Bees, of which the following is a specification:

Figure 1 is a vertical longitudinal section of my improved device. Fig. 2 is a rear view of the same.

The object of this invention is to furnish an improved device for removing swarms of bees from the limbs of trees where they have alighted, and placing them in hives, which shall be simple in construction and convenient in use.

The invention consists in the sheet-metal cup or vessel, constructed as described, and provided with a socket to receive a handle, as hereinafter fully described.

A is a funnel-shaped vessel made of tin or other suitable sheet metal. The rear side of the vessel A is straight and its forward side is inclined or flared, and has its upper edge concaved, as shown in Fig. 1, and in dotted lines in Fig. 2. To the rear side of the lower end of the vessel or cup A is secured a socket, B, to receive the upper end of a handle, C. The connection between the socket B and the vessel A is strengthened by a band, D, passed around the lower end of the socket, and attached to the said cup or vessel. The upper part of the rear side of the vessel A is stiffened and strengthened by a plate, E, attached to it, to prevent the said upper part from being bent or bruised by being thrust against the limb upon which the swarm has alighted.

The device should be provided with a set of handles, C, of different lengths, to enable it to be used for removing the swarms from limbs of different heights.

In using the device, the vessel A is placed beneath the swarm, and its upper edge is forced against the limb with sufficient force to jar the swarm from the limb into the said vessel. The device is then lowered and placed beneath the hive into which the swarm is to be put, or in front of a hive placed upon the ground or platform, and slightly inclined backward.

Having thus described my invention, I claim as new and desire to secure by Letters Patent—

The sheet-metal cup or vessel A, constructed as described, and provided with a socket, B, to receive a handle, C, substantially as herein shown and described.

JAMES WASH.

Witnesses:
 ANTHONY RIATH,
 NELSON LOVETT.